United States Patent
Xu et al.

(10) Patent No.: US 8,718,490 B2
(45) Date of Patent: May 6, 2014

(54) COHERENT OPTICAL ORTHOGONAL FREQUENCY DIVISION MULTIPLEXING (OFDM) RECEPTION USING SELF OPTICAL CARRIER EXTRACTION

(75) Inventors: Lei Xu, Princeton, NJ (US); Junqiang Hu, Princeton, NJ (US); Ting Wang, West Windsor, NJ (US); Dayou Qian, Plainsboro, NJ (US); Yutaka Yano, Tokyo (JP)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 1076 days.

(21) Appl. No.: 12/183,332

(22) Filed: Jul. 31, 2008

(65) Prior Publication Data
US 2009/0092393 A1   Apr. 9, 2009

Related U.S. Application Data

(60) Provisional application No. 60/977,119, filed on Oct. 3, 2007.

(51) Int. Cl.
*H04B 10/61* (2013.01)
(52) U.S. Cl.
USPC .......................................... 398/203; 398/205
(58) Field of Classification Search
CPC ...... H04B 10/63; H04B 10/61; H04B 10/613; H04B 10/614
USPC .................................................. 398/202-214
See application file for complete search history.

(56) References Cited

U.S. PATENT DOCUMENTS

| | | | |
|---|---|---|---|
| 8,081,885 B2 * | 12/2011 | Jansen et al. | 398/203 |
| 8,175,466 B2 * | 5/2012 | Djordjevic et al. | 398/202 |
| 8,295,845 B1 * | 10/2012 | Abdollahi-Alibeik et al. | 455/445 |
| 8,472,813 B2 * | 6/2013 | Cvijetic et al. | 398/205 |
| 8,538,278 B2 * | 9/2013 | Batshon et al. | 398/205 |
| 2006/0063483 A1 * | 3/2006 | Suematsu et al. | 455/3.02 |
| 2008/0120529 A1 * | 5/2008 | Sugiura et al. | 714/780 |
| 2008/0152361 A1 * | 6/2008 | Chen et al. | 398/205 |
| 2009/0074415 A1 * | 3/2009 | Xie | 398/79 |
| 2009/0092393 A1 * | 4/2009 | Xu et al. | 398/79 |
| 2010/0014873 A1 * | 1/2010 | Bulow | 398/159 |

FOREIGN PATENT DOCUMENTS

| | | |
|---|---|---|
| JP | 54-114005 A | 9/1979 |
| JP | 2003-284129 A | 10/2003 |

* cited by examiner

*Primary Examiner* — David Payne
*Assistant Examiner* — Tanya Motsinger
(74) *Attorney, Agent, or Firm* — Joseph Kolodka

(57) ABSTRACT

A method includes producing interference between a received optical OFDM signal and an optical carrier extracted from the received optical OFDM signal to provide optical coherent detection of the received optical OFDM signal. Preferably, producing the interference includes optically splitting the received optical OFDM signal into a first part that is filtered to extract the carrier from the received optical OFDM signal and a second part similar to the received optical OFDM signal.

8 Claims, 2 Drawing Sheets

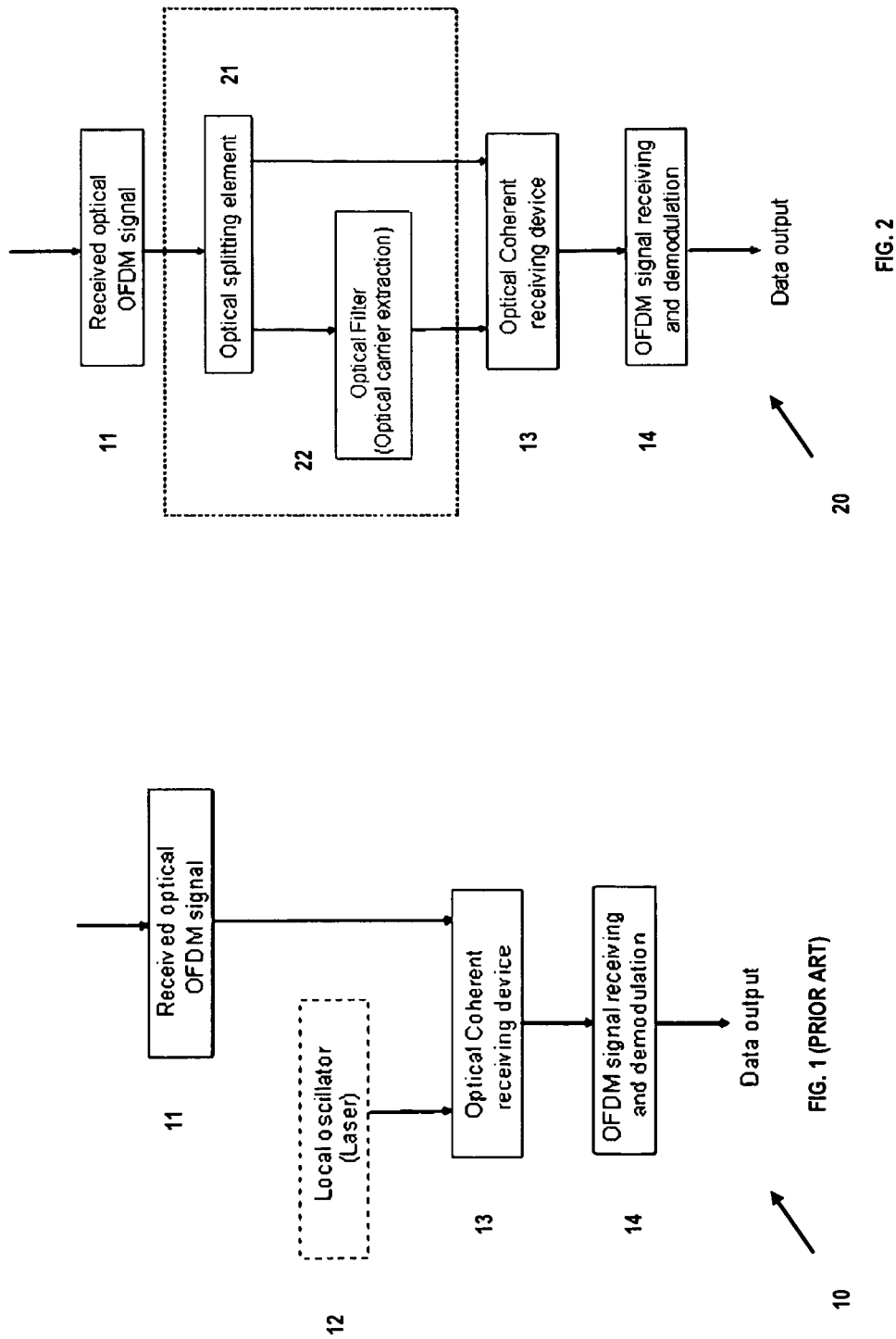

COHERENT OPTICAL ORTHOGONAL FREQUENCY DIVISION MULTIPLEXING (OFDM) RECEPTION USING SELF OPTICAL CARRIER EXTRACTION

This application claims the benefit of U.S. Provisional Application No. 60/977,119, entitled "Coherent Optical Orthogonal Frequency Division Multiplexing (OFDM) Systems Using Self Optical Carrier Extraction", filed on Nov. 3, 2007, the content of which is incorporated by reference herein.

BACKGROUND OF THE INVENTION

Orthogonal frequency division multiplexing (OFDM) is a popular digital modulation scheme in radio frequency (RF) wireless communications. In principle, OFDM uses multiple closely spaced orthogonal subcarriers, and each subcarrier is modulated at a relatively low symbol rate. In practice, OFDM be implemented using fast Fourier transform (FFT) algorithms, and signal processing technologies are further leveraged to improve the OFDM system performance. OFDM has been shown to have strong ability to cope with severe channel conditions (e.g. RF channels with large multi-path fading effect) and have high spectral efficiency. OFDM has been applied in WiMAX, wireless LAN, ADSL, digital radio and video broadcasting systems, and was chosen as a candidate technology in wireless 4G standards.

Recently OFDM over optical fiber transmission has attracted a lot of attention. Optical OFDM systems have been shown to have superior tolerance to fiber CD and PMD. Compared with incoherent optical OFDM, coherent optical OFDM can have higher receiver sensitivity and better transmission performance. However, coherent optical OFDM receivers inherit the many issues facing a traditional coherent optical communication system, including the need of an extra local optical oscillator (laser), the phase noise and frequency drift of the local laser, and the random polarization rotations of the incoming signals. Although some signal processing algorithms have been proposed and demonstrated to effectively mitigate the phase noise and polarization rotation issues in the electrical domain, their demand on high-speed signal processing and computation power becomes increasingly high and makes it highly challenging to implement a real time system at high speed.

Also, system performance of optical OFDM signal transmission over fiber relies heavily on complex digital signal processing (DSP). When the system bit rate is beyond 40 Gb/s, the current DSP processing speed and computation power fall far behind what an optical OFDM system would require. Therefore, it is important to design new architectures of optical OFDM systems, simplify the system and reduce the requirements on DSP circuits.

The diagram 10 in FIG. 1 illustrates the conventional approach for coherent OFDM signal detection of a received signal 11 using a local oscillation (LO) laser 12. The light from LO laser 12 interferes with the incoming optical OFDM signal 11 at the coherent receives 13 and the signal is then demodulated 14. Since the two beating light beams come from two independent light sources, the phase noises of the LO laser and random phase fluctuations of the incoming signal can cause signal degradations.

Accordingly, there is need for a new coherent optical OFDM receiver using self optical carrier extraction.

SUMMARY OF THE INVENTION

A method includes receiving an incoming light beam containing an optical OFDM signal carrying an optical carrier component, wherein data is fed to an electro-optical (EO) modulator sourced by a laser and the EO modulated output is filtered, amplified and sent over an optical fiber, wherein the optical carrier component from the incoming signal uses zero padding in OFDM modulation; producing an interference light beam between a received optical OFDM signal and an optical carrier extracted from the received optical OFDM signal to provide optical coherent detection of the received optical OFDM signal, wherein the incoming light beam and the interference light beam have one polarization state and have one central wavelength for homodyne detection, and optically splitting the received optical OFDM signal into a first part that is filtered with an optical filter to extract the carrier from the received optical OFDM signal and a second part similar to the received optical OFDM signal; and determining an error vector magnitude (EVM) as:

$$EVM = \sqrt{\frac{\frac{1}{N}\sum_{j=1}^{N}[|I_j - \tilde{I}_j|^2 + |Q_j - \tilde{Q}_j|^2]}{\frac{1}{N}\sum_{j=1}^{N}[|\tilde{I}_j|^2 + |\tilde{Q}_j|^2]}}$$

where
$I_j$ is the I component of the j-th symbol received,
$Q_j$ is the Q component of the j-th symbol received,
$\tilde{I}_j$ is the ideal I component of the j-th symbol received,
$\tilde{Q}_j$ is the ideal Q component of the j-th symbol received.

In accordance with the invention, a method includes producing interference between a received optical OFDM signal and an optical carrier extracted from the received optical OFDM signal to provide optical coherent detection of the received optical OFDM signal. Preferably, producing the interference includes optically splitting the received optical OFDM signal into a first part that is filtered to extract the carrier from the received optical OFDM signal and a second part similar to the received optical OFDM signal.

In another aspect of the invention, a method includes splitting a received optical OFDM signal into a first part and a second part, each part having optical spectrum characteristics of the received optical OFDM signal; optically filtering the first part to extract an optical carrier from the received optical OFDM signal; and receiving the extracted optical carrier and the second part into a coherent receiver. The optical filtering can be one of fixed bandpass filtering for a certain wavelength, tunable bandpass filtering for incoming signals at different wavelengths, and periodic bandpass filtering for incoming signals at different wavelengths on a certain wavelength grids.

BRIEF DESCRIPTION OF DRAWINGS

These and other advantages of the invention will be apparent to those of ordinary skill in the art by reference to the following detailed description and the accompanying drawings.

FIG. 1 is a diagram of a conventional approach for coherent optical frequency division multiplexing OFDM signal detection using a local oscillation laser.

FIG. 2 is a block diagram of optical frequency division multiplexing OFDM using self optical carrier extraction in accordance with the invention.

DETAILED DESCRIPTION

Figure 3:
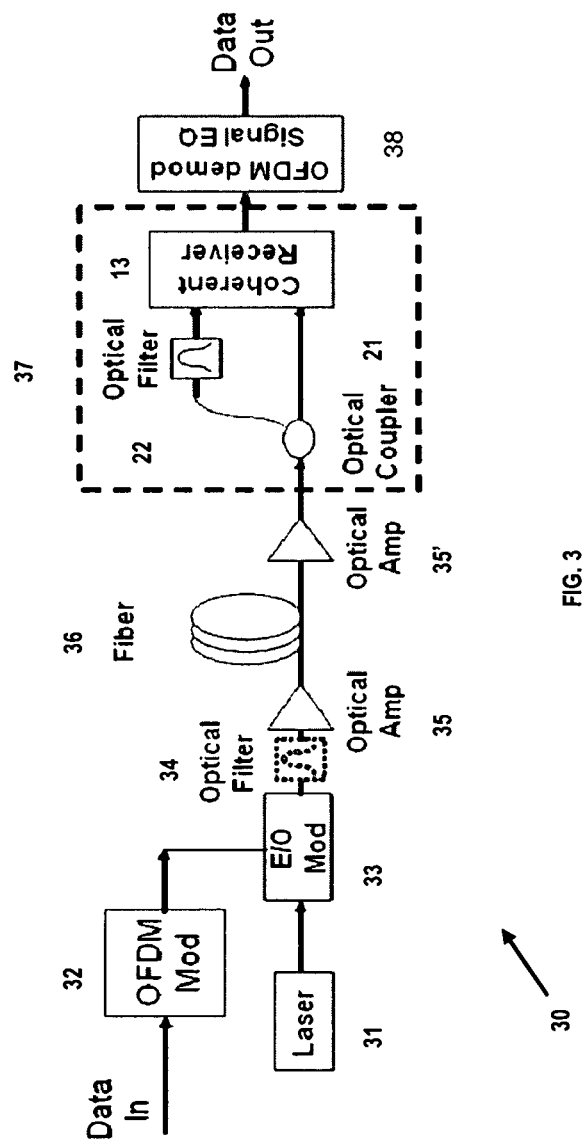
FIG. 3 is a schematic diagram of an exemplary coherent OFDM system with self optical carrier extraction optical system in accordance with the invention.

The invention is directed to a coherent optical OFDM receiver using self optical carrier extraction. The carrier component in optical OFDM signals is filtered out from the optical OFDM signal to interfere with the OFDM signal for coherent signal detection. Since the interference optical carrier is extracted from the incoming signal, the incoming light and the interference light can be kept at the same polarization state and have the same central wavelength for homodyne detection.

The diagram 20 of FIG. 2 illustrates the inventive self carrier extraction in an OFDM system. At the receiver side, the incoming signal 11 is split 21 into two branches: one goes directly to the coherent receiver 13 as incoming optical OFDM signal, and the other one passes through a narrow band optical filter 22 to have the optical carrier component extracted for interference at the coherent receiving device 13 for subsequent demodulation.

The inventive technique of extracting the optical carrier from the incoming optical OFDM signal and using the extracted carrier for further coherent detection of the received signal brings many system benefits. The received signal does not degrade with random phase changes of incoming signal even without carrier phase recovery. The system has much better tolerance to lasers with large line width than conventional approaches. Compared with coherent detection using a local laser, self carrier extraction scheme can lower the system cost by saving a laser.

The diagram 30 of FIG. 3 illustrates an exemplary optical OFDM system employing the inventive technique of extracting an optical carrier from a received signal and using the extracted carrier for coherent detection of the received signal. At the transmission side OFDM modulation 32 of data is fed to an electro-optical modulator 33 sourced by a laser 31. The EO modulated output is filtered 34, amplified 35 and sent over an optical fiber 36 and amplified 35' at a receiving end.

The generated optical OFDM signal has an optical carrier component. This can be generally done by having a radio frequency carrier in the transmitter side. The electro-optical (E/O) modulation 33 scheme can be phase modulation, intensity modulation, or carrier suppression modulation. The optical filter 34 at the transmitter side can be used to generate single-side band signals, and it is optional.

At the receiver side, a self carrier extraction 37 scheme includes an optical coupler 21, an optical filter 22 and a coherent receiver 13. The optical coupler splits the incoming optical signal into two parts. The optical filter 22 is used to extract the optical carrier component from the optical spectrum of the incoming signal. The coherent receiver 13 produces the interference between the extracted optical carrier and the incoming optical signal, and converts the optical signals to electrical ones.

The optical filter 22 can be a fixed bandpass filter for a certain wavelength, a tunable bandpass filter for incoming signals at different wavelengths, or a periodic bandpass (or comb) filter for incoming signals at different wavelengths on certain wavelength grids (e.g. ITU grids).

The device can be built with free-space optical components, (e.g. athermal free-space optics platforms), or fiber-based optical components.

From the above discussion it is clear that inventive aspect of extracting an optical carrier extracted from the incoming optical OFDM signal and using the extracted carrier for further coherent detection brings many benefits. The received signal does not degrade with random phase changes of incoming signal even without carrier phase recovery. The system has much better tolerance to lasers with large line width than conventional approaches. Compared with coherent detection using a local laser, the inventive self carrier extraction used for coherent detection can lower the system cost by saving a laser.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method comprising:
receiving an incoming light beam containing an optical OFDM signal carrying an optical carrier component, wherein data is fed to an electro-optical (EO) modulator sourced by a laser and the EO modulated output is filtered, amplified and sent over an optical fiber, wherein the optical carrier component from the incoming signal uses zero padding in OFDM modulation;
producing an interference light beam between a received optical OFDM signal and an optical carrier extracted from the received optical OFDM signal to provide optical coherent detection of the received optical OFDM signal,
wherein the incoming light beam and the interference light beam have one polarization state and have one central wavelength for homodyne detection, and
optically splitting the received optical OFDM signal into a first part that is filtered with an optical filter to extract the carrier from the received optical OFDM signal and a second part similar to the received optical OFDM signal; and
determining an error vector magnitude (EVM) as:

$$EVM = \sqrt{\frac{\frac{1}{N}\sum_{j=1}^{N}[|I_j - \tilde{I}_j|^2 + |Q_j - \tilde{Q}_j|^2]}{\frac{1}{N}\sum_{j=1}^{N}[|\tilde{I}_j|^2 + |\tilde{Q}_j|^2]}}$$

where
$I_j$ is the I component of the j-th symbol received,
$Q_j$ is the Q component of the j-th symbol received,
$\tilde{I}_j$ is the ideal I component of the j-th symbol received,
$\tilde{Q}_j$ is the ideal Q component of the j-th symbol received.

2. The method of claim 1, wherein the optical filter comprises one of a fixed bandpass filter for a certain wavelength, a tunable bandpass filter for incoming signals at different wavelengths, and a periodic bandpass or comb filter for incoming signals at different wavelengths on a certain wavelength grids.

3. A method comprising the steps of:
embedding an optical carrier component into a transmitted OFDM signal, wherein data is fed to an electro-optical (EO) modulator sourced by a laser and the EO modulated output is filtered, amplified and sent over an optical fiber;
splitting an incoming light beam containing a received optical OFDM signal into a first part and a second part, each part having optical spectrum characteristics of the received optical OFDM signal;

optically filtering the first part to extract an optical carrier from the received optical OFDM signal; and receiving the extracted optical carrier and the second part into a coherent receiver, generating an interference light beam, wherein the incoming light beam and the interference light beam have one polarization state and have one central wavelength for homodyne detection, and optically splitting the received optical OFDM signal into a first part that is filtered with an optical filter to extract the carrier from the received optical OFDM signal and a second part similar to the received optical OFDM signal using a radio frequency carrier or including zero padding in OFDM modulation; and determining an error vector magnitude (EVM) as:

$$EVM = \sqrt{\frac{\frac{1}{N}\sum_{j=1}^{N}[|I_j - \tilde{I}_j|^2 + |Q_j - \tilde{Q}_j|^2]}{\frac{1}{N}\sum_{j=1}^{N}[|\tilde{I}_j|^2 + |\tilde{Q}_j|^2]}}$$

where $I_j$ is the I component of the j-th symbol received, $Q_j$ is the Q component of the j-th symbol received, $\tilde{I}_j$ is the ideal I component of the j-th symbol received, $\tilde{Q}_j$ is the ideal Q component of the j-th symbol received.

4. The method of claim 3, wherein the step of receiving comprises producing an interference between the received optical OFDM signal and the extracted optical carrier.

5. The method of claim 4, wherein the optical filtering comprises one of fixed bandpass filtering for a certain wavelength, tunable bandpass filtering for incoming signals at different wavelengths, and periodic bandpass filtering for incoming signals at different wavelengths on a certain wavelength grids.

6. The method of claim 3, comprising splitting an incoming signal into a first branch at a coherent optical receiver as an incoming optical OFDM signal, and a second branch passing through a narrow band optical filter to extract an optical carrier component for interference at the coherent optical receiver for subsequent demodulation.

7. The method of claim 3, comprising generating an optical OFDM signal with an optical carrier component by having a radio frequency carrier in a transmitter side.

8. The method of claim 3, comprising providing tolerance to lasers with predetermined line width, wherein the optical OFDM signal does not degrade incoming signals with random phase changes or without carrier phase recovery.

* * * * *